(No Model.)
J. C. TAYLOR.
ROLLER BEARING WELL WHEEL PULLEY.
No. 567,055.  Patented Sept. 1, 1896.
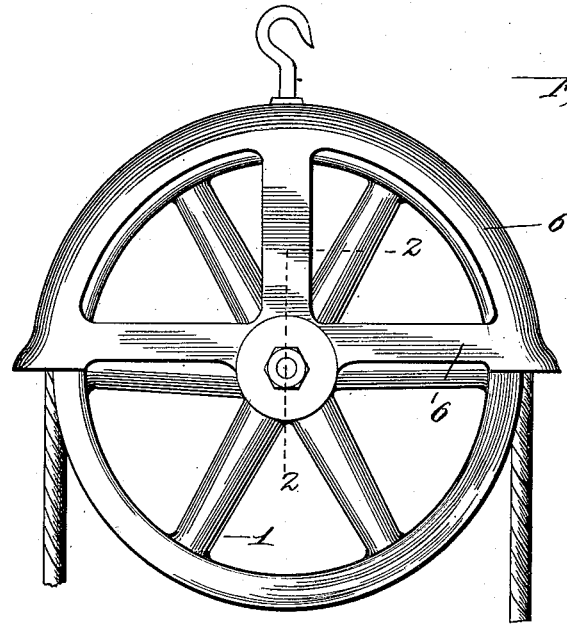
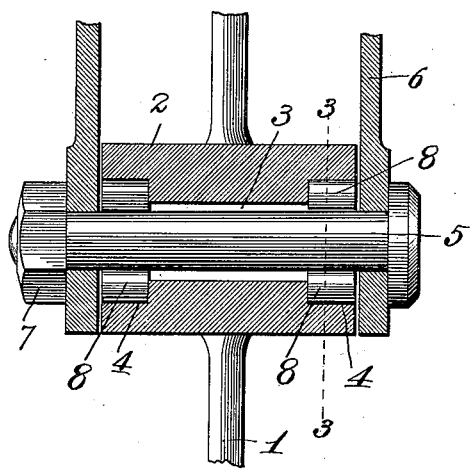
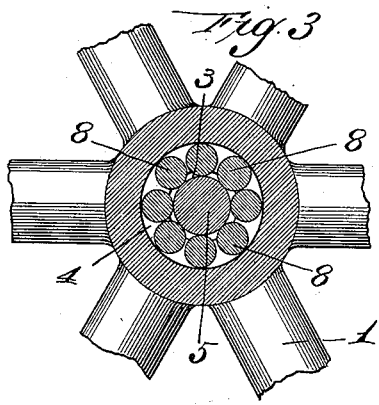
Attest
John L. Tunison
M. P. Smith
Inventor
J. C. Taylor
By Higdon & Higdon & Longan
Attys

UNITED STATES PATENT OFFICE.

JOHN C. TAYLOR, OF DALLAS, TEXAS.

ROLLER-BEARING WELL-WHEEL PULLEY.

SPECIFICATION forming part of Letters Patent No. 567,055, dated September 1, 1896.

Application filed November 21, 1895. Serial No. 569,624. (No model.)

*To all whom it may concern:*

Be it known that I, JOHN C. TAYLOR, of the city of Dallas, Dallas county, State of Texas, have invented certain new and useful Improvements in Roller-Bearing Well-Wheel Pulleys, of which the following is a full, clear, and exact description, reference being had to the accompanying drawings, forming a part hereof.

My invention relates to an improved roller-bearing pulley; and it consists in the novel construction, combination, and arrangement of parts hereinafter described and claimed.

In the drawings, Figure 1 is a side elevation of my improved roller-bearing pulley. Fig. 2 is an enlarged vertical sectional view taken approximately on the indicated line 2 2 of Fig. 1. Fig. 3 is a vertical cross-sectional view taken approximately on the indicated line 3 3 of Fig. 2.

Referring by numerals to the accompanying drawings, 1 indicates the pulley, the same being constructed with an ordinary grooved rim in which the rope or cable travels, the hub 2 of said pulley being provided with the axially-arranged bore or passage 3, at each end of which and in the faces of said hub are formed annular recesses or bearing-faces 4.

5 indicates the axle of the pulley, which is in the form of a headed bolt, the same being of a diameter slightly smaller than is the bore 3 through the hub 2, and said bolt 5 passes through the side walls of the semicircular casing 6, that surrounds a portion of the pulley, said bolt being held to said casing by a nut 7, that is located upon its protruding screw-threaded end.

Arranged around the axle or bolt 5 and within the recesses 4 are rollers 8, the diameters of which are greater than is the depth of the recesses or cut-away portions 4. Therefore said rollers engage upon the periphery of the axle or bolt 5, and the interior surface of the bore 3 through the hub 2 does not bear upon said axle or bolt.

The operation of my improved pulley is obvious, and a pulley so constructed is noiseless, requires no lubricant, is very durable, easy running, and will not easily get out of order.

I claim—

A roller-bearing pulley, comprising the wheel 1, having a grooved rim and the hub 2 of said pulley being provided with the axially-arranged bore 3 at each end of which and in the faces of said hub the annular recesses 4 are formed, the axle 5 passing through the bore 3 in the hub 2, said axle being slightly less in diameter than said bore, the semicircular casing 6, surrounding a portion of said wheel and having apertures in which said axle 5 is supported, the nut 7 located upon the screw-threaded end of said axle, and the rollers 8 arranged around the axle 5 and within the recesses 4, substantially as stated.

In testimony whereof I affix my signature in presence of two witnesses.

JOHN C. TAYLOR.

Witnesses:
J. C. McKAY,
W. C. McCORMICK.